Figure 1:
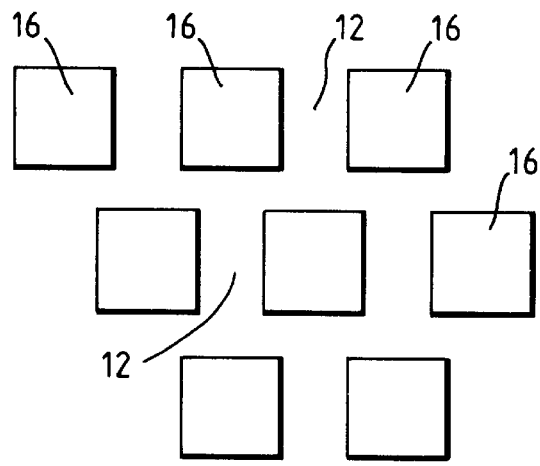

United States Patent
Phillips et al.

[11] Patent Number: 5,926,319
[45] Date of Patent: Jul. 20, 1999

[54] SCREENS HAVING GRADED REFRACTIVE INDEX LENSES

[75] Inventors: Nicholas John Phillips, Loughborough; William Nevil Johnson, St. Peter Port, both of United Kingdom

[73] Assignees: Nashua Corporation, Nashua, N.H.; Nashua Photo Ltd., United Kingdom

[21] Appl. No.: 08/604,943

[22] PCT Filed: Sep. 1, 1994

[86] PCT No.: PCT/GB94/01899
§ 371 Date: Apr. 22, 1997
§ 102(e) Date: Apr. 22, 1997

[87] PCT Pub. No.: WO95/06887
PCT Pub. Date: Mar. 9, 1995

[30] Foreign Application Priority Data

Sep. 2, 1993 [GB] United Kingdom .................. 9318219
Oct. 8, 1993 [GB] United Kingdom .................. 9320743

[51] Int. Cl.⁶ .................................................. G02B 27/10
[52] U.S. Cl. ........................................... 359/620; 359/619
[58] Field of Search .................................. 359/618, 619, 359/620, 625, 626, 452, 454, 455

[56] References Cited

U.S. PATENT DOCUMENTS

| | | | |
|---|---|---|---|
| 3,552,822 | 1/1971 | Altman | 359/453 |
| 3,609,000 | 9/1971 | Miyano et al. | 359/453 |
| 4,068,922 | 1/1978 | Dotsko | 359/452 |
| 4,111,695 | 9/1978 | Yevick | 96/40 |
| 4,877,717 | 10/1989 | Suzuki et al. | 430/321 |
| 5,471,881 | 12/1995 | Hochstein | 73/700 |
| 5,473,454 | 12/1995 | Blanchard | 359/69 |
| 5,568,313 | 10/1996 | Steenblik et al. | 359/463 |

Primary Examiner—Georgia Epps
Assistant Examiner—Ricky Mack
Attorney, Agent, or Firm—Webb Ziesenheim Logsdon Orkin & Hanson, P.C.

[57] ABSTRACT

Various combinations of different optical features in a microlens screen are disclosed. In one arrangement, a screen is provided for depixelating purposes, comprising an array of transparent rectangular portions (14) in a light diffusing field (20) formed by minute closely packed microlenses of a graded refractive index type. In another arrangement, a screen formed with an array of integral graded refractive index lenses has surface refractive index lenses additionally provided by part-spherical embossments on a surface of the screen, the embossments being of one or more orders of magnitude greater in diameter than the graded refractive index lenses. There are also disclosed techniques for preventing light transmission through a microlens screen except through the microlenses, the use of microlens screens to improve the performance of solar panels and microlens screens conforming to a part-spherical surface.

12 Claims, 2 Drawing Sheets

SCREENS HAVING GRADED REFRACTIVE INDEX LENSES

RELATED APPLICATION

This application is the U.S. National Phase of International Application No. PCT/GB94/01899, filed on Sep. 1, 1994, which claims priority to United Kingdom Application No. 9318219.4, filed Sep. 2, 1993, and United Kingdom Application No. 9320743.9, filed Oct. 8, 1993.

THIS INVENTION relates to light diffusing and depixelating screens or layers incorporating graded refractive index (GRIN) microlenses or other optical features. Screens of this type, made from photopolymerized material are disclosed, for example, in European Patent Specification No. 0294122, International (WO) Published Specifications Nos. WO91/18304 and WO92/1605 and in co-pending International Patent Application PCT/GB94/01281 to which reference should be had.

European Patent No. 0294111 discloses a microlens screen comprising a sheet of transparent material formed with an array of integral microlenses which are spaced apart from one another in the plane of the sheet with each microlens having an optical axis extending through the sheet material from one major face thereof to another, for example extending normal to the plane of the sheet material or inclined relatively slightly to a normal to such plane.

In the microlens screen disclosed in European Patent No. 0294122 the transparent material is a variable refractive index polymer and the individual lenses, forming said array of microlenses, are graded refractive index (GRIN) lenses or which owe at least a substantial part of their optical power to graded refractive index effects in the polymer.

The present invention relates to light diffusing screens having graded refractive index features which are not, strictly speaking, lens-like in character, as well as to screens having graded refractive index microlenses.

According to one aspect of the invention there is provided a microlens screen which is provided, on at least one surface thereof, with an opaque coating extending over the regions between adjoining microlenses in the array but not occluding the microlenses themselves.

Preferably the opaque layer is black.

European Patent No. 0294122 describes a method of making a graded refractive index microlens screen in which a photopolymerizable monomer, for example an acrylamide monomer, Provo ed in the f ore of a sheet or layer of viscous fluid or tacky gel, is exposed selectively at each of a plurality of spots (corresponding to the eventual microlenses) to ultraviolet light to cause polymerization selectively in the spots illuminated. Subsequently, after polymerization in the region of the spots so illuminated, the material is subjected to a blanketing exposure to ultraviolet light to cure the remainder of the material unexposed during the initial, selective exposure. The material may be heated before or after the selective exposure.

In a preferred embodiment of the above-noted aspect of the present invention, in which the microlens screen comprises a sheet of photopolymer material substantially as disclosed in Eur opean Patent No. 0294122, advantage is taken of the fact that, at a time after the selective exposure and before the blanketing exposure, the unpolymerized material (monomer) is significantly tacky, whereas the photopolymerized material, which forms the individual microlenses, is substantially dry and non-tacky, by applying to one surface of the material, after it has been selectively exposed in the regions where microlenses or analogous features are desired to be formed but before the subsequent blanketing exposure, a layer of a black opaque material, such as Chromalin, which adheres to the tacky regions but not the dry polymerized regions defining the microlenses. Subsequently the Chromalin material is removed from the non-adhesive regions. The same technique may be applied to certain other photopolymers. For example, the photopolymer used may be that supplied by Du Pont under the Registered Trade Mark OMNIDEX and having the type designation HRF150 or HRF600. The monomer in the HRF series photopolymers is fluorescent N-vinyl-carbazole (NVC) dispersed in a plasticized polyvinyl acetate (PVAC), cellulose acetate butyrate (CAB) or polyvinyl butyrate (PVB) as the polymeric binder. The material may be initiated either by photoinitiators or by a photosensitizing dye/initiator combination.

The OMNIDEX materials are available in sheet form, comprising a layer of the monomer on a polyester film base (MYLAR) the layer being entirely covered with a polyester (MYLAR) film.

Chromalin comprises a layer of extremely finely divided pigment particles (black pigment in the present context) weakly bonded to a supporting film. In the preferred embodiment of the invention in this aspect, after the photopolymerizable material has been exposed in the regions where the microlenses are desired to be formed but before the subsequent blanketing exposure, said supporting film is applied to the photopolymerizable material, with the pigment layer adjoining the photopolymerizable material and is brought into intimate contact with the latter, e.g. by rolling. The supporting film is subsequently peeled off, taking with it the pigment particles which were in contact with the non-tacky polymerized regions, but leaving the pigment adhered to the tacky regions. The photopolymerizable material may then be subjected to a blanketing exposure to polymerizing light.

The technique described above is of particular utility in relation to microlens arrays which, for one reason or another, are required to be strictly regular, since in such cases a substantial percentage of the screen is necessarily occupied by interstices between adjacent microlenses, whereas if a regular array is not required, then it may be possible to adopt arrangements in which interstices between larger adjoining microlenses are at least partially occupied by smaller microlenses, substantially reducing the percentage of the screen through which non-refractive light transmission is possible.

In another variant, the aperture mask is formed from black acrylic sheet material formed with a plurality of circular apertures in a regular array corresponding to the desired microlens array. To this acrylic sheet is applied a layer of the photopolymerizable monomer material. The photopolymerizable monomer may be stocked in sheet form comprising a layer of the photopolymerizable material on a backing of flexible Mylar sheet, the layer of photopolymer being in turn covered by a relatively thin protective release sheet. Using the photopolymerizable material in this form, therefore, the release sheet is first stripped off, the exposed (and tacky) surface of the monomer applied to the acrylic sheet and pressed there against to adhere thereto and thereafter the Mylar backing sheet is stripped from the photopolymerizable layer. The photopolymerizable material is then exposed to UV light through the black acrylic "mask" to produce the microlenses by selective photopolymerization of the material in contact with the mask. The subsequent blanketing exposure to UV light is, of course, from the side opposite the acrylic sheet.

The black acrylic mask, which remains in situ with the photopolymer, serves to prevent light from passing through the screen without passing through the lenses, i.e. from passing through the interstices between lenses. This form of microlens screen, like the form in which Chromalin pigment between adjacent microlenses performs the same function as said black acrylic mask, is well suited to use in a close viewing arrangement for pixelated LCD screens, for example. Thus, in one arrangement, care is taken, by appropriate control of parameters, to ensure that each microlens is as free from aberration as is practicable and that each lens in the array is of the same diameter and focal length and that the array is regular to ensure a good packing ratio (i.e. ratio of area made up by microlenses to area made up by interstices between microlenses). The microlens screen is so arranged in relation to the LCD screen that the spacing between the LCD screen and the median plane of the microlens screen is substantially equal to the focal length of the microlenses, so that the light emerging from each microlens is substantially in the form of a respective parallel beam, so that to an observer the image of the LCD screen is perceived to be at infinity.

Whilst, in many applications of microlens screens, the image-forming quality of the individual microlenses is of little relevance, in some applications it is desirable for each lens to have a well-defined focus with consequently good image-forming properties. For such applications it is desirable that each microlens acts substantially as a conventional spherical lens. One way of achieving this desired result is to utilize, instead of an aperture mask as disclosed in European Patent No. 0294122 in which each "aperture" is characterised by an abrupt transition from transparency to opacity at its edges, a mask in which each "aperture" has its "edge" regions formed as a neutral filter of precisely determined variation in density from the edge of the "aperture" towards the center thereof, thereby controlling more precisely the variation in U.V. Immunization over the region of the intended microlens and thus controlling more precisely the refractive index changes across the lens. (As disclosed in European Patent No. 0294122, diffraction at the edge of each aperture already contributes some of the desired light intensity variation, whilst the tendency of polymerization to "spread" from an illuminated area into a non-illuminated area, for example, produces some variation in the degree of polymerization, and hence in refractive index variation independently of variation in polymerising UV. exposure). Of course, the precise mode of radial variation of neutral filter density in each aperture should be determined having regard to the above-noted other effects which contribute to refractive index variation across the lens.

Where the photopolymerizable material has a surface unconfined by, for example, an overlying plastics film, during polymerization, such polymerization results in a relief pattern on such surface which, in the case where the GRIN lenses are converging lenses, provides such lenses with convex end surfaces. Heating of the material during polymerization tends to "spread" such profiling in such a way as to render more accurately spherical such end surfaces.

In accordance with another aspect of the invention there is provided a microlens screen comprising a sheet of photopolymer incorporating an array of graded refractive index microlenses, said sheet having, additionally, at least one major surface thereof embossed or otherwise surface-contoured so as to afford, in use, a lens action due to refraction at the surface of each such embossment, independently of and additional to the lens action of each graded refractive index lens.

Whilst, in some embodiments there may be, for example, a respective part-spherical embossment for each graded refractive index lens in the photopolymer material and in optical alignment with its graded refractive index lens, so that the graded refractive index lens and its respective part-spherical lens form, in effect, a multi-element lens, in preferred embodiments of the invention, there is no strict one-to-one relation between the graded refractive index lenses and the embossments and, indeed, in the preferred embodiment of the present invention the individual part-spherical (for example) or quasi part-spherical embossments may have diameters one or several orders of magnitude greater than the individual graded refractive index lenses.

The invention, according to this aspect, makes it possible, in effect, to separate the light mixing and diffusion effect, primarily carried out by the array of graded refractive index lenses, from larger scale distribution of light from the screen in directions at angles to the normal to the screen (assuming the light in question to be incident normally onto the screen). Thus where, for example, the diffusing screen is intended to perform a depixelating function in relation to a color LCD display or C.R.T., the GRIN microlenses serve to mix the light from the Red, Green and Blue pixels for each picture element, allowing the perception of each picture element as being of the intended color rather than as comprising three distinct areas or pixels of red, green and blue respectively, whilst the embossed lenses serve to direct desired proportions of the thus mixed light to various desired angles off-axis to ensure, for example, that the screen appears to the eye to be uniformly illuminated across its width and height, without any "hot spot" effect and to ensure that satisfactory off-axis viewing of the screen is possible. Thus the GRIN lenses and the embossments can, with fewer restraints, be configured to suit their respective functions.

Whilst, for convenience, the surface configuration or contouring of the screen has been described above as being provided by embossing, it will be appreciated that a corresponding effect may be provided by, for example, applying the photopolymerizable material in a flowable or liquid state to a mold surface of complementary configuration, without departing from the invention.

Furthermore, instead of forming the embossments or surface lenses directly on the photopolymer material, such embossments or surf ace lenses may be formed on a separately provided transparent sheet which is subsequently bonded to the photopolymer sheet.

According to another aspect of the invention there is provided a method of improving the performance of photo-electric sensors or solar cells of the type comprising a mono-crystalline plate of semi-conductor material, such as silicon, doped to form a P-N junction parallel with and close to the surface of the plate which is exposed to light, which method comprises providing over the exposed surface of such semiconductor plate a microlens screen as herein defined, each microlens being arranged to focus the light falling thereon onto a respective spot on such surface. Thus, the light f alling on the sensor or solar cell is focused onto a plurality of discrete spots on the surface of the semiconductor material. It has been found that such an arrangement, for a given average illumination of the exposed semiconductor surface, provides a higher electrical output from the device than an arrangement where the same average illumination is provided uniformly across said surface. By utilizing this technique, it is possible to obtain a higher signal to noise ratio for such a semiconductor device when used as a detector of illumination or sensor than in known arrangements where such device is illuminated uniformly. Likewise, where such semiconductor devices are used, for example, in an extended array as a generator of electricity, for example as a so-called solar panel, it is possible, using the technique described, to provide a higher electrical output from such a panel. By way of example, a solar panel may comprise a plurality of individual solar cells of the type referred to covered by a single microlens screen which thus, in addition to affording the focusing effect referred to above, also serves to protect the individual cells from physical damage, ingress of water, etc. A corresponding technique may be used in relation to amorphous seni-conductor sensors or solar cells.

There are applications in which it is necessary or desirable to deal with curved image surfaces, for example in conjunction with optical systems affording curved image surfaces, for example part-spherical image surfaces, and where, nevertheless, the diffusion properties of a microlens screen, as herein defined, would be beneficial. In accordance with another variant of the invention, a curved microlens screen, or indeed a microlens screen conforming to any desired surface configuration, can be formed by providing a former affording a curved surface of the desired shape, or a surface whatever other configuration is required, applying a layer of photopolymerizable material to said surface to conform therewith and exposing the photopolymerizable material to ultra-violet light through a correspondingly configured opaque mask having light-transmitting apertures of predetermined size and shape and in a predetermined arrangement or array to form a microlens diffusing or other array lying substantially in the desired spherically curved (or other configured as desired) surface. The aperture mask may itself be formed by depositing on said former surface, or on a supporting film applied to said surface, a layer of an opaque etchable material, such as metallic chrome, depositing a photoresist on said layer of etchable material, exposing the photoresist to an appropriate light pattern, removing the unexposed photoresist, and etching the etchable material in the regions so exposed, to provide a mask conforming to the spherical or other desired surface and having the desired arrangement of light-transmitting apertures therethrough. Of course, the exposure of the photoresist in the above process may itself be made through a part-spherical mask (or mask of other desired configuration) of silver halide photographic emulsion on a conforming light-transmitting substrate (for example formed by applying a layer of a curable transparent resin to the the photographic material to spots of light, spot by spot, at the desired locations, and then developing the photographic medium.

Another embodiment of the invention is of particular utility in relation to the depixelation of LCD visual display screens, particularly LCD display screens of small size intended to be viewed under magnification, for example, in the viewing device which is the subject of International Patent Application PCT/GB92/00396 published as WO92/16075. Such depixelation, whilst particularly desirable in relation to LCD screens in view of the relatively large dimensions of the pixels having regard to the typically small overall size of such screens, may also be applied, with advantage, to CRT displays, particularly color CRT displays where the color picture is made up of discrete red, green and blue dots which are perceptible, at least at close range, in the same way as the pixels of an LCD screen. Accordingly, microlens screens as described in the prior patent and applications referred to above and, where appropriate, as described herein, may usefully be used with CRT displays, for example, with the microlens screen being applied to the face of the CRT tube, or being incorporated in the wall of the tube which affords the display screen during manufacture for example so as to be immediately adjacent the CRT phosphor or closer thereto than would be possible if the microlens screen were applied after the tube had been sealed and evacuated, bearing in mind the thickness of the screen wall of the finished tube necessary to provide the required strength. Even in relation to monochrome CRT displays, the use of such a microlens screen may be advantageous in ensuring that the light from the display is efficiently channeled in the direction in which it is most required, i.e. towards the presumed viewer, thereby enhancing perceived brightness and contrast.

Figure 2:
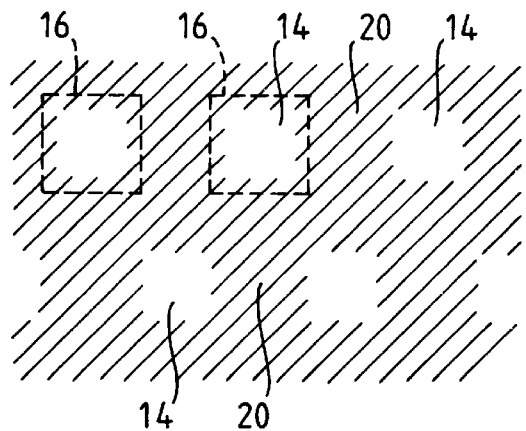
Figure 3:
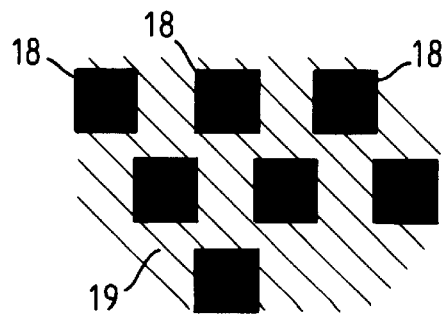
Figure 4:
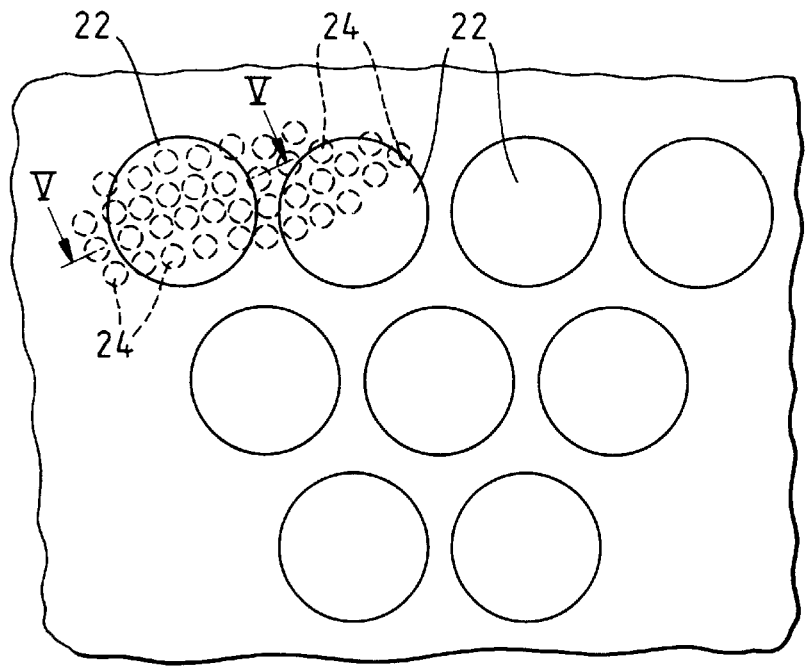
Figure 5:
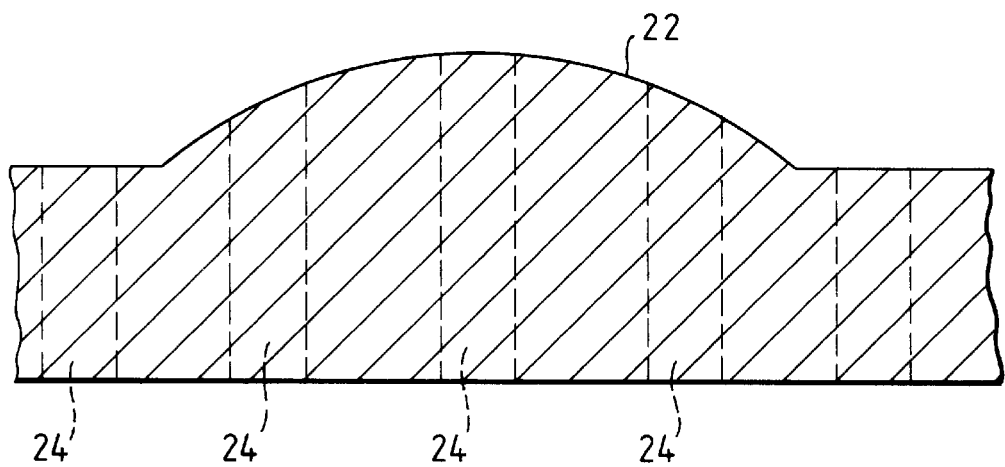

Preferred embodiments of the invention, in some of the above-noted aspects, are described below, by way of example, with reference to the accompanying drawings, in which:

FIG. 1 is a diagrammatic fragmentary view, to an enlarged scale, of a pixelated LCD screen, FIG. 2 is a diagrammatic fragmentary view, to a similarly enlarged scale, of a depixelating screen embodying the invention, FIG. 3 is a corresponding fragmentary view of a mask which may be used in production of the depixelating screen of FIG. 2, FIG. 4 is a diagrammatic fragmentary view to an enlarged scale, of a microlens screen embodying the invention in another of its aspects, and FIG. 5 is a diagrammatic sectional view along the line V—V of FIG. 4.

Referring to the drawings, FIG. 1 illustrates a fragment of an LCD screen, which consists, in manner known per se, of an array of pixels 16, (here shown as square or rectangular) which form the picture elements and transmit light or not according to electrical signals applied in a manner known per se to associated conductors. The reference numeral 12 in FIG. 1 represents a region defined by the interstices between adjacent pixels 16. These interstices are necessarily of appreciable width (although their width is exaggerated in FIG. 1), and are necessary to preserve electrical separation between the transparent electrically conductive elements which define the pixels and to accommodate transparent electrically conductive strips e xtending to the various pixels. These regions 12 thus detract from picture information rather than contributing to it. The LCD display is generally arranged so that the regions 12 appear black to the viewer since this makes them less obtrusive, but they still represent a visually undesirable feature of the display particularly if the display is to be viewed under magnification. In accordance with the present invention and referring to FIG. 2, it has been found that the black interstitial region 12 can be rendered less visible or invisible by arranging in front of the LCD screen, (but behind any optical system used for magnification of the LCD screen image) a light-diffusing screen comprising an array of transparent "windows" 14 with the screen material having light-diffusing characteristics in the interstices 20 between windows 14. There is one window 14 for each pixel 16 of the display and each window 14 is in alignment with its respective pixel 16. The windows 14 are also of substantially the same shape as their respective pixels and are thus of generally square or rectangular configuration in FIG. 2. However, as perceived by the viewer, the diffusion region 20 encroaches to a significant extent over the edges of the pixels 16, as illustrated in broken lines in FIG. 2, so that the edges of the pixels 16 as well as the regions 12 of the LCD screen are masked by the diffusing regions 20. The diffusion regions 20 tend to spread the light from the pixels into the interstices between the pixels, as viewed, thereby minimizing or even eliminating the perception of the interstitial regions 12. Preferably the light-diffusing screen is formed of a photopolymer graded refractive index material such as referred to above and is made in the following fashion. A layer of the photopolymerizable material is exposed to ultra-violet light through a mask of the form illustrated schematically and fragmentarily in FIG. 3, comprising an array of rectangular opaque regions 18, corresponding to the desired windows 14 and, in the interstices between opaque areas 18, a dense array of light-transmitting apertures in an opaque background, or vice versa, and which array is represented at 19 by the cross-hatching in FIG. 3. Such a mask may be formed photographically by exposing a layer of silver halide photographic medium to laser light through a ground glass or fibre optic screen to produce a "speckling" exposure of the photographic material in the manner described in co-pending International Patent Application PCT/GB94/01281. The photographic medium is then exposed to a pattern of fully illuminated rectangles (corresponding to the regions 18 in FIG. 3), in the desired array and the photographic medium developed and subjected to a photographic reversal process, known per se, (so that regions exposed to light are transparent in the resulting "transparency" whereas portions not exposed are opaque). The resulting transparency is then used to produce, by known photo-etching techniques, a "negative" of the transparency, a metallic chromium mask through which the photopolymeric material is exposed. The reversal processing of the photographic material results in a desirable sharp contrast and definition in the pattern.

The square or rectangular regions may be exposed on the photographic material using an appropriate imaging system. By way of example, the square or rectangular regions may be exposed one at a time, or a group or sub-array at a time, using an imaging laser technique such as an E-beam imaging technique, with the laser being indexed with respect to the photographic medium, or vice versa, at each exposure step.

It may be useful to arrange that the diffusing effect of the region 20 in the diffusing screen diminishes gradually towards the middle of the respective window 14 and this may be achieved by providing the rectangular opaque regions 18 in the mask with edges which are substantially irregular on a microscopic scale rather than relatively abrupt. This may be achieved, for example, by having such edge regions fractally composed, by printing such edge regions, or those of the precursor photographic material, by printing of an E-beam written micromask, produced by E-beam lithography, onto the photographic medium at successive locations thereon.

It has been found that with an arrangement in which a depixelating microlens screen as described above with reference to FIGS. 1 to 3 of the drawings is superimposed upon a pixelated LCD screen, with each "window" corresponding with a respective pixel, disturbing Moire effects may occur in certain parts of the picture area viewed or over the screen as viewed from certain viewing angles. It has been found that these effects, or their noticeability, can be much reduced by a controlled randomizing of the arrangement of the transparent "windows" relative to the array of LCD pixels. In the preferred form of the invention, taking, for each "window" a nominal center position for the central of the "window", corresponding substantially with the position at the center of the respective LCD pixel, each "window" is given a small displacement from that central position which is random with regard to direction in the plane of the microlens screen. The magnitude of such small displacement may also be randomly determined from window to window. If desired, such displacement may be preferentially arranged in one direction, for example horizontally, for the frequent instances where the eyes of different viewers may be at generally the same viewing level but are likely to be at a variety of different angles in a horizontal plane with respect to the screen and LCD display.

The randomization of the "window" locations may be produced in any convenient way, and is preferably incorporated in the mask through which the photopolymerizable substance is exposed. Thus, for example, in one method, during the exposure of the master "negative" for the mask, as described above, in which the photographic medium is indexed stepwise mechanically, e.g. under computer control, in two mutually perpendicular directions in its plane and at each indexing step, using an imaging laser, the image of the respective "window" is projected onto the respective small area of the photographic medium where the respective "window" is to be formed. With such an arrangement, in order to obtain the desired randomization, the laser beam may be directed onto the photosensitive material by way of a mirror so mounted as to permit limited angular movement, the mirror having associated therewith deflecting means for imparting small random angular movements to the mirror to produce corresponding small deflections of the projected image onto the photosensitive material from the respective "normal" position. The deflecting means may comprise, for example, a piezo electric device or a galvo motor associated with the mirror and supplied by appropriate electric signals, for example produced by the computer controlling the indexing movement of the photographic or photosensitive plate, in accordance with random or pseudo-random numbers generated by the computer.

Referring to FIGS. 4 and 5, FIG. 4 represents, schematically, a view to an enlarged scale, of a microlens screen comprising a sheet of light transmitting photopolymer material, which has an array of part-spherical surface embossments 22 each of which forms a respective surface-refractive converging lens (in the arrangement shown where the embossments 22 are convex). The photopolymer sheet also incorporates an array of integral graded refractive index lenses, indicated in broken lines at 24, the lenses 24, like the lenses 22, being spaced from each other in the plane of the sheet, with each microlens 24 having a respective optical axis extending through the sheet material from one major surface thereof to the other. It will be noted that the individual embossments or surface refractive lenses 22 are of substantially greater diameter than the individual graded refractive index lenses 24.

In general, the individual part-spherical or quasi part-spherical embossments 22 may have diameters one or several orders of magnitude greater than the individual graded refractive index lenses 24.

For the sake of clarity, the spacing between adjacent graded refractive index lenses 24 has been greatly exaggerated in FIG. 5.

The arrangement de scribed with reference to FIGS. 4 and 5 has various uses. When used as a depixelating screen, for example, this arrangement makes it possible, in effect, to separate the light mixing and diffusion effect, primarily carried out by the array of graded refractive index lenses, from larger scale distribution of light from the screen in directions at angles to the normal to the screen (assuming the light in question to be incident normally onto the screen). Thus where, for example, the diffusing screen is intended to perform a depixelating function in relation to a color LCD display or C.R.T., the GRIN microlenses serve to mix the light from the Red, Green and Blue pixels for each picture element, allowing the perception of each picture element as being of the intended color rather than as comprising three distinct areas or pixels of red, green and blue respectively, whilst the embossed lenses serve to direct desired proportions of the thus mixed light to various desired angles off-axis to ensure, for example, that the screen appears to the eye to be uniformly illuminated across its width and height, without any "hot spot" effect and to ensure that satisfactory off-axis viewing of the screen is possible. Thus the GRIN lenses and the embossments can, with fewer restraints, be configured to suit their respective functions.

Whilst, for convenience, the surface configuration or contouring of the screen has been described above as being provided by embossing, it will be appreciated that a corresponding effect may be provided by, for example, applying the photopolymerizable material in a flowable or liquid state to a mold surface of complementary configuration, without departing from the invention.

Furthermore, instead of forming the embossments or surface lenses directly on the photopolymer material, such embossments or surface lenses may be formed on a separately provided transparent sheet which is subsequently bonded to the photopolymer sheet.

Furthermore, it will be appreciated that concave surface embossments or the equivalent may be provided instead of convex and that the graded refractive index lenses may likewise be converging lenses or diverging lenses.

The arrangement described with reference to the drawings have in common the novel principle of incorporating in a single light-transmitting screen, light controlling or modifying features of two sorts. Thus in the arrangement of FIGS. 1 to 3, light diffusing areas and areas which allow light to pass substantially without modification are combined, being disposed at different locations in the plane of the screen, whilst in the arrangement of FIGS. 4 and 5, surface refractive lenses and graded refractive index lenses are superimposed.

Many variations on this theme are possible. Thus, considering the arrangement of FIGS. 1 to 3, in some applications it may be desired to utilize a screen in which an array of light diffusing areas is disposed in a clear, transparent field, rather than vice versa as in FIGS. 1 to 3. Alternatively, in variants of either of the last-noted arrangements, the areas which are clear and transparent in the above-noted arrangements may be opaque, or may be tinted or may form a neutral density filter or filters, or may be polarizing. Furthermore, the areas described above as polarizing may instead be occupied by microlenses of different diameter or power, or optical features (such as "speckle" features) of different mean diameter or power, from the microlenses or other features in the remaining areas and so on.

Whilst, in many applications of microlens screens, the image-forming quality of the individual microlenses is of little relevance, in some applications it is desirable for each lens to have a well-defined focus with consequently good image-forming properties. For such applications it is desirable that each microlens acts substantially as a conventional spherical lens. One way of achieving this desired result is to utilize, instead of an aperture mask as disclosed in European Patent No. 0294122 in which each "aperture" is characterized by an abrupt transition from transparency to opacity at its edges, to a mask in which each "aperture" has its "edge" regions formed as a neutral filter of precisely determined variation in density from the edge of the "aperture" towards the center thereof, thereby controlling more precisely the variation in U.V. Immunization over the region of the intended microlens and thus controlling more precisely the refractive index changes across the lens. (As disclosed in European Patent No. 0294122, diffraction at the edge of each aperture already contributes some of the desired light intensity variation, whilst the tendency of polymerization to "spread" from an illuminated area into a non-illuminated area, for example, produces some variation in the degree of polymerization, and hence in refractive index variation independently of variation in polymerizing U.V. Espousers). Of course, the precise mode of radial variation of neutral filter density in each aperture should be determined having regard to the above-noted other effects which contribute to refractive index variation across the lens.

Where the photopolymerizable material has a surface unconfined by, for example, an overlying plastics film, during polymerization, such polymerization results in a relief pattern on such surface which, in the case where the GRIN lenses are converging lenses, provides such lenses with convex end surfaces. Heating of the material during polymerization tends to "spread" such profiling in such a way as to render more accurately spherical such end surfaces.

We claim:

1. A light diffusing screen comprising:
    a sheet of photopolymer comprising a first lens element and a second lens element, the first lens element comprising localized regions of graded refractive index variations and the second lens element comprising surface refractive lenses formed by the surface of the sheet,
    wherein the surface area of each of the surface refractive lenses is substantially greater than the surface area of each of the localized regions of graded refractive index variations.

2. The light diffusing sheet of claim 1 wherein each of the localized regions of graded refractive index variations has a gradual change in refractive index across the localized region.

3. The light diffusing sheet of claim 1 wherein the localized regions of graded refractive index variations have convex end surfaces.

4. The light diffusing sheet of claim 1 wherein the surface refractive lenses are convex.

5. The light diffusing sheet of claim 1 wherein the surface refractive lenses are spherical.

6. A method of making a light diffusing sheet comprising:
    (a) providing a sheet of photopolymer;
    (b) selectively polymerizing the sheet of photopolymer by exposing selected areas of the sheet to radiation sufficient to cause polymerization of the exposed areas, thereby forming graded refractive index variations in said exposed areas; and
    (c) disposing an opaque layer onto unpolymerized surface areas of the sheet of photopolymer between the graded refractive index variations.

7. The method of claim 6 wherein step (c) comprises disposing a layer of black pigment onto the sheet of photopolymer between the graded refractive index variations.

8. The method of claim 6 wherein step (c) is carried out by a two step process comprising:
    contacting the sheet of photopolymer with opaque particles which are disposed on a supporting layer; and
    peeling away the supporting layer from the sheet of photopolymer,
    wherein the opaque particles remain disposed on the unpolymerized surface areas of the sheet of photopolymer.

9. The method of claim 6 further comprising the step:

(d) polymerizing the unpolymerized areas of the photopolymer by exposing the entire sheet of photopolymer to radiation sufficient to induce polymerization.

10. The method of claim 6 wherein step (b) is carried out by a two step process comprising:

applying an opaque sheet defining transparent apertures to the sheet of photopolymer; and selectively polymerizing areas of the sheet of photopolymer exposed by the apertures to radiation sufficient to cause polymerization of the exposed areas, thereby forming graded refractive index variations in said exposed areas.

11. The method of claim 10 further comprising the step:

(d) polymerizing the unpolymerized areas of the photopolymer by exposing the entire sheet of photopolymer to radiation sufficient to induce polymerization.

12. The method of claim 10 wherein the apertures of the opaque layer have a gradual transition from opacity to transparency from the edge of the aperture to the center point of the aperture.

* * * * *

UNITED STATES PATENT AND TRADEMARK OFFICE
CERTIFICATE OF CORRECTION

PATENT NO. : 5,926,319
DATED : July 20, 1999
INVENTOR(S) : Nicholas John Phillips et al.

It is certified that error appears in the above-identified patent and that said Letters Patent is hereby corrected as shown below:

Title Page, refer to [86] §371 Date and §102(e) Date:
"Apr. 22, 1997" should read --Apr. 22, 1996-- (both occurrences).

Title Page, under [56] References Cited, under "U.S. PATENT DOCUMENTS" insert:

--5,040,870    8/1991    Ohno et al..............359/443
  5,279,689    1/1994    Shvartsman.............156/220
  5,442,482    8/1995    Johnson et al..........359/619--.

Title Page, under [56] References Cited, after list of U.S. PATENT DOCUMENTS insert:
--FOREIGN PATENT DOCUMENTS
 0294122    7/1988    Eur.Pat.Off.--.

Column 1, Line 48 after "monomer," delete "Provo ed in the f ore" and insert --provided in the form--.

Column 1 Line 61 "Eur opean" should read --European--.

Column 3 Line 36 "Immunization" should read --illumination--.

Column 4 Line 44 "surf ace" should read --surface--.

Column 4 Line 57 "f alling" should read --falling--.

Column 5 Line 45 between "the" and "the" insert --mold surface or to an identical mold surface and exposing--.

Column 6 Line 42 "e xtending" should read --extending--.

Column 8 Line 57 "de scribed" should read --described--.

Column 10 Line 1 "Immunization" should read --illumination--.

UNITED STATES PATENT AND TRADEMARK OFFICE
CERTIFICATE OF CORRECTION

PATENT NO. : 5,926,319
DATED : July 20, 1999
INVENTOR(S) : Nicholas John Phillips et al.

It is certified that error appears in the above-identified patent and that said Letters Patent is hereby corrected as shown below:

Column 10 Line 10 "Espousers" should read --exposure--.

Signed and Sealed this

Twenty-fifth Day of April, 2000

Attest:

Q. TODD DICKINSON

*Attesting Officer*     *Director of Patents and Trademarks*